United States Patent [19]

Sederquist

[11] 4,200,682
[45] Apr. 29, 1980

[54] INTEGRATED FUEL CELL AND FUEL CONVERSION APPARATUS

[75] Inventor: Richard A. Sederquist, Newington, Conn.

[73] Assignee: United Technologies Corporation, Hartford, Conn.

[21] Appl. No.: 21,392

[22] Filed: Mar. 16, 1979

[51] Int. Cl.$^2$ ............................................. H01M 8/06
[52] U.S. Cl. ......................................... 429/17; 429/20
[58] Field of Search ................................... 429/17, 20

[56] References Cited

U.S. PATENT DOCUMENTS

| | | | |
|---|---|---|---|
| 1,794,232 | 2/1931 | Humphrey | 23/213 |
| 2,289,922 | 7/1942 | Mekler | 196/52 |
| 2,879,139 | 3/1959 | Thomsen | 23/213 |
| 3,380,800 | 4/1968 | Marten | 23/2 |
| 3,397,962 | 8/1968 | Squires | 23/213 |

*Primary Examiner*—Donald L. Walton
*Attorney, Agent, or Firm*—Stephen E. Revis

[57] ABSTRACT

A pair of reaction vessels provide hydrogen to a fuel cell by making hydrogen in one of the vessels while simultaneously regenerating the other vessel, and then reversing the function of the vessels. In the vessel making hydrogen a hydrocarbon feedstock is cracked and steam reformed using sensible heat generated during the regeneration of the vessel. Regeneration includes preheating, separately within the reaction vessel, fuel cell fuel electrode exhaust and an oxygen containing gas. Preheating is accomplished using the heat of combustion and/or sensible heat stored within material disposed within the vessel while it is making hydrogen. After being preheated the fuel electrode exhaust and oxygen containing gas are allowed to mix and combust within the vessel, thereby heating materials disposed therein. This heat is the heat used to crack and steam reform the hydrocarbon fuel.

14 Claims, 10 Drawing Figures

A COMPLETION OF REFORMING
B COMPLETION OF REGENERATION

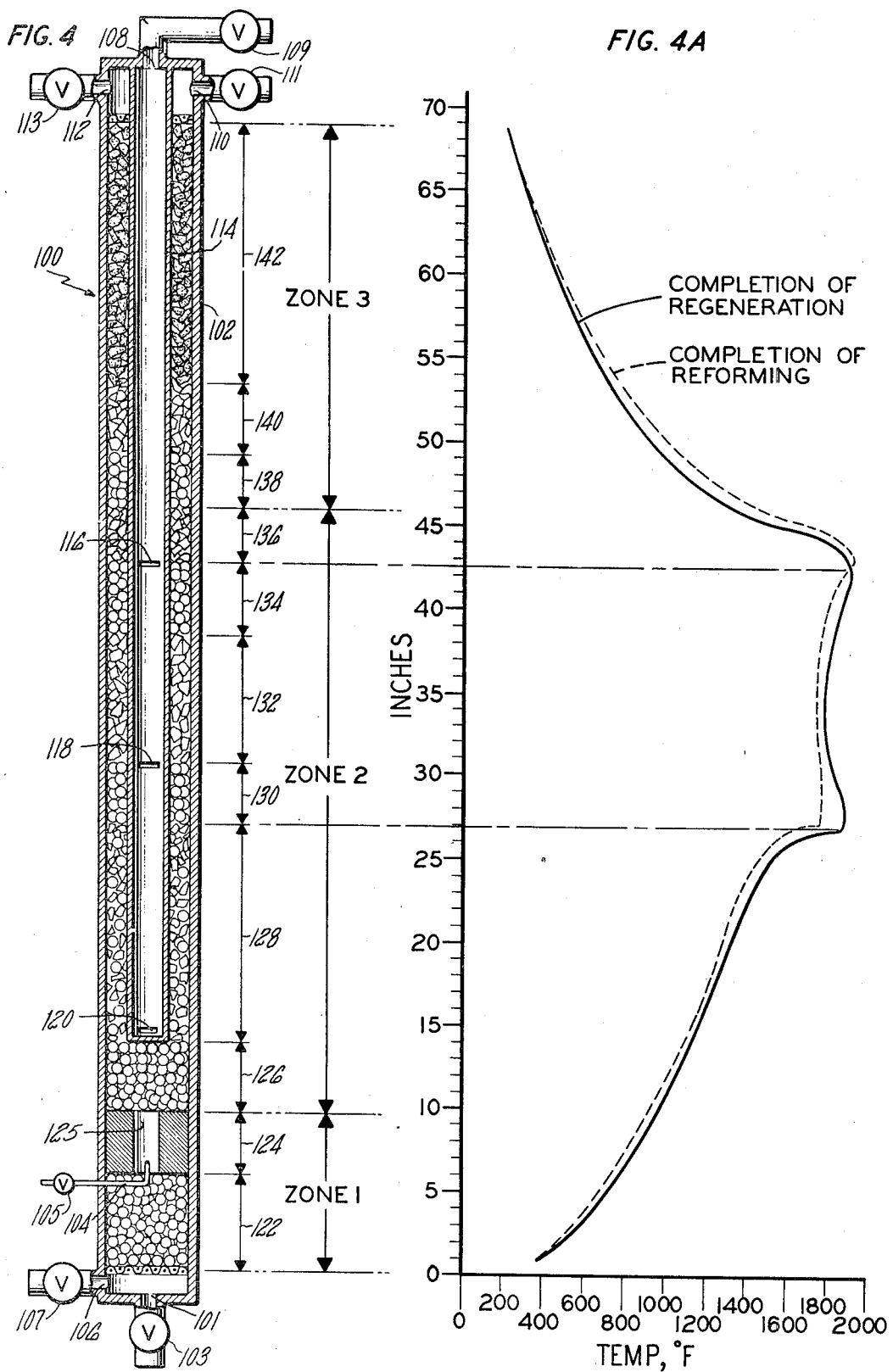

4,200,682

INTEGRATED FUEL CELL AND FUEL CONVERSION APPARATUS

RELATED APPLICATION

U.S. patent application Ser. No. 21,393 titled "Reaction Apparatus for Producing A Hydrogen Containing Gas" by Richard A. Sederquist, filed on even date herewith and of common assignee with the present application, describes and claims subject matter which is related to the present application.

BACKGROUND OF THE INVENTION

1. Field of the Invention

This invention relates to methods and apparatus for producing a hydrogen containing gas from a hydrocarbon feedstock.

2. Description of the Prior Art

In the prior art, producing a hydrogen containing gas, such as hydrogen, from a hydrocarbon feedstock is typically accomplished by passing the feedstock (and steam if the conversion process is steam reforming) through catalyst filled tubes disposed within a furnace. Fuel and air are burned within the furnace to provide heat for the catalytic reaction taking place within the tubes. In order to improve the efficiency of such apparatus some efforts have been directed to improving the uniformity of heat distribution to the tubes within the furnace while minimizing the amount of energy used to produce each unit of hydrogen containing gas. For example, in commonly owned U.S. Pat. No. 4,098,587 to R. A. Sederquist et al the reaction tubes are clustered closely together in a furnace, with baffles and sleeves surrounding each tube to improve heat transfer from the combusting gases in the furnace into the catalyst beds. Each catalyst bed is annular; and a portion of the heat in the product gases leaving the bed is returned to the bed to further the reaction process by flowing these product gases through a narrow annular chamber along the inside wall of the annular catalyst bed. The example given in column 7 of the Sederquist et al patent indicates that an overall reactor thermal efficiency of 90% was achieved with the apparatus described therein. Other commonly owned patents of a somewhat similar nature are U.S. Pat. Nos. 4,071,330; 4,098,588; and 4,098,589.

One drawback of the approaches taken in all of the foregoing patents is that the heat for the conversion process is still provided indirectly by means of heat transfer through reactor walls. Also, a considerable amount of heat energy leaves the furnace with the furnace exhaust gases. Although some of this heat can be recovered and used for other purposes, such as producing steam, it would be more beneficial if this heat energy could be used in the conversion process.

Another process and apparatus for the catalytic conversion of hydrocarbons by steam is shown and described in a paper titled "Conversion Catalytique et Cyclique Des Hydrocarbures Liquides et Gazeux" published by Société Onia-Gegi. That system comprises a first vessel including a first heat exchange chamber, followed by a second vessel containing a catalyst bed, followed by a third vessel including a second heat exchange chamber. In operation, steam is introduced into the first vessel and is preheated as it passes through hot checkerbricks disposed within the chamber. Downstream of the checkerbricks the preheated steam is mixed with a hydrocarbon feedstock and the mixture passes into the second vessel containing a heated catalyst bed by means of a conduit interconnecting the two vessels. Conversion takes place as the mixture passes through the heated catalyst bed. Hot conversion products leave the second vessel and enter the third vessel, whereupon the hot conversion products give up heat to checkerbricks which are disposed therein. The conversion products may then be stored or used directly.

When the temperatures in the first heat exchange chamber and in the catalyst bed are too low to convert the feedstock, the apparatus is switched to a regeneration cycle. In the regeneration cycle air is introduced into the third vessel and is preheated as it passes through the checkerbricks disposed therein which were heated during the conversion cycle. Downstream of the checkerbricks a fuel, such as oil, is mixed with the preheated air and combusts. In order to keep combustion temperatures within acceptable limits, air in excess of that required for stoichiometric combustion is used. The hot combustion products are directed into the second vessel and pass through the catalyst bed, therein heating the same. This is the heat which is used during the conversion cycle. Because of the excess air, the catalyst bed is oxidized, although this is not desirable. (During the conversion mode of the cycle the oxidized catalyst is reduced back to the metal; this requires use of some of the hydrogen being manufactured, and has a negative impact on efficiency).

After passing through the catalyst bed the combustion products are directed into the first vessel and give up additional heat to the checkerbricks disposed therein. This is the heat which is used to preheat the steam during the conversion cycle.

Commonly owned U.S. Pat. No. 3,531,263 describes an integrated reformer unit comprised of a can-type structure which houses the reaction components of a system for converting hydrocarbon feedstocks to hydrogen. This compact apparatus, in one embodiment, comprises a center tube containing a volume of reform catalyst, followed immediately by a region of heat transfer packing material, followed by a volume of shift conversion catalyst. Surrounding the tube over its entire length is an annular passage. Air is introduced into the end of the annular passage adjacent the shift catalyst volume of the center tube. It is mixed with fuel approximately adjacent the interface between the heat transfer packing material and the reform catalyst. The fuel and air burn and travel further downstream around the outside of that portion of the center tube carrying the reform catalyst. Simultaneously a mixture of a hydrocarbon feedstock and water enter the center tube at the reform catalyst end. Steam reforming takes place within the catalyst bed with the heat being provided by the hot combustion products flowing countercurrent in the annulus around the outside of the tube. As the reform products leave the catalyst bed they give up heat to the heat transfer packing material in the next following region. This heat is used to preheat the air flowing around the outside of this heat transfer region before the air is mixed with the fuel and burned. The cooled products from the packing material region then pass through the shift conversion catalyst volume whereupon carbon monoxide present therein is converted to additional hydrogen and carbon dioxide. This reaction is exothermic, and the heat produced thereby preheats the air flowing around the outside of the tube.

While the foregoing apparatus is compact, and careful attention has been given to the overall heat balance and heat requirements of the hydrogen generating reaction, most heat transfer is still indirect and a significant amount of the heat energy generated within the apparatus, leaves the apparatus with the combustion exhaust and the reform products.

SUMMARY OF THE INVENTION

It is one object of the present invention to provide a novel, highly efficient method and apparatus for converting a hydrocarbon feedstock into a hydrogen containing gas.

A further object of the present invention is compact apparatus for the conversion of a hydrocarbon feedstock to a hydrogen containing gas.

Yet another object of the present invention is a method and means for efficiently integrating a fuel cell with apparatus for converting a hydrocarbon feedstock to hydrogen.

According to the present invention a continuous supply of hydrogen is provided to a fuel cell from a pair of reaction vessels by making hydrogen in one of the vessels while simultaneously regenerating the other vessel, and then reversing the function of the vessels. In the step of making hydrogen, a hydrocarbon feedstock and steam flows into the vessel and is cracked and steam reformed using sensible heat which was generated therein during the regeneration of the vessel; and the step of regenerating the vessel includes directing the fuel cell fuel electrode exhaust and an oxygen containing gas into the vessel, preheating the fuel electrode exhaust and oxygen containing gas separately within the vessel, and mixing these preheated gases and combusting them within the vessel, wherein the step of preheating is accomplished using the heat of combustion and/or sensible heat stored within material disposed within the vessel during the making of hydrogen therein.

In a preferred arrangement, the oxygen containing gas used during regeneration is the exhaust from the cathode electrode of the fuel cell. Since both the anode and cathode exhausts contain water vapor which is produced by the fuel cell, the exhaust from the reaction vessel being regenerated will also contain steam. A portion of the exhaust from this reaction vessel may, therefore, be utilized as the steam supply in the reaction vessel which is making hydrogen. This eliminates the need for a separate steam source, such as a boiler and improves the overall system efficiency.

Hereinafter, for the purposes of a more general discussion of the detailed operation of the reaction vessels per se, the fuel electrode exhaust is referred to as a "hydrogen purge gas", since the reaction vessels, per se, can be regenerated using any gas containing as least some hydrogen. The purpose of the hydrogen purge gas is simply to combust with the oxidant (e.g. air) which is also introduced into the vessel during regeneration. The hydrogen purge gas may also contain other combustibles, such as carbon monoxide and methane. Heavier hydrocarbons are undesirable (but not necessarily intolerable) since they could form carbon upon cracking. The purge gas may also include noncombustibles, such as carbon dioxide, water vapor and nitrogen. In addition to fuel cell anode exhaust, hydrogen purge gas may be, for example, pure hydrogen or the purge effluent from well known pressure swing adsorption type hydrogen purification systems.

Preferably each reaction vessel has three zones arranged in sequence. During the making of the hydrogen (i.e., make mode) the hydrocarbon feedstock and steam are preheated within the first zone which is filled with material which was heated during regeneration of the reaction vessel. Gasification (i.e., cracking and reforming), of the feedstock and steam mixture takes place within the next following second zone of heated material which includes a region of reform catalyst. The gas so produced is then cooled in a lower temperature third zone, thereby increasing the temperature of the material within the third zone. The heat used in making the hydrogen is restored by regenerating the reaction vessel (i.e., regeneration mode). Regenerating is accomplished by separately preheating, within the vessel, a hydrogen purge gas (such as the fuel cell anode electrode exhaust) and an oxygen containing gas (such as air) using the sensible heat stored during the make mode in material disposed in the vessel. The preheated hydrogen purge gas and air are then permitted to mix together and burn within the second of the above-mentioned zones to reheat the material in that zone. Combustion products from the second zone are then cooled by passing them through the first zone, whereby material in the first zone is reheated.

The reaction vessels of the present invention are very compact and highly efficient. All of the energy expended in the method is utilized to directly convert the feedstock to hydrogen. Virtually all heat transfer is direct, which eliminates losses typically associated with indirect heating and cooling. Preheating of both the hydrogen purge gas and the oxygen containing gas without using an external heat source also increases efficiency by recovering the maximum amount of heat from the product gas of the make mode. Maximizing preheating minimizes the amount of hydrogen purge gas which must be burned to provide process heat, which also increases efficiency. Thermal efficiencies of 97% and perhaps higher can be obtained by the method of the present invention.

Separate preheating of the hydrogen purge gas and oxygen containing gas during regeneration is also an important aspect of the present invention. In one embodiment this may be done by preheating the oxygen containing gas within separate conduits disposed within the reaction vessel. This allows both gases to be preheated simultaneously with no combustion occurring until the oxidant exits the conduits. If the combustion products are assumed to travel in a downstream direction, reform catalyst may be disposed in the reaction vessel upstream of the oxidant conduit outlets without fear of catalyst oxidation. Separate preheating within the reaction vessel of the hydrogen purge gas and the oxygen containing gas provides other advantages which will be explained in more detail in the Description of Preferred Embodiments.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 4 is a vertical, cross-sectional view of yet another catalytic reaction vessel according to the present invention.

FIG. 4A is a graph showing actual temperature profiles within the reaction vessel of FIG. 4.

DESCRIPTION OF THE PREFERRED EMBODIMENTS

Figure 1:
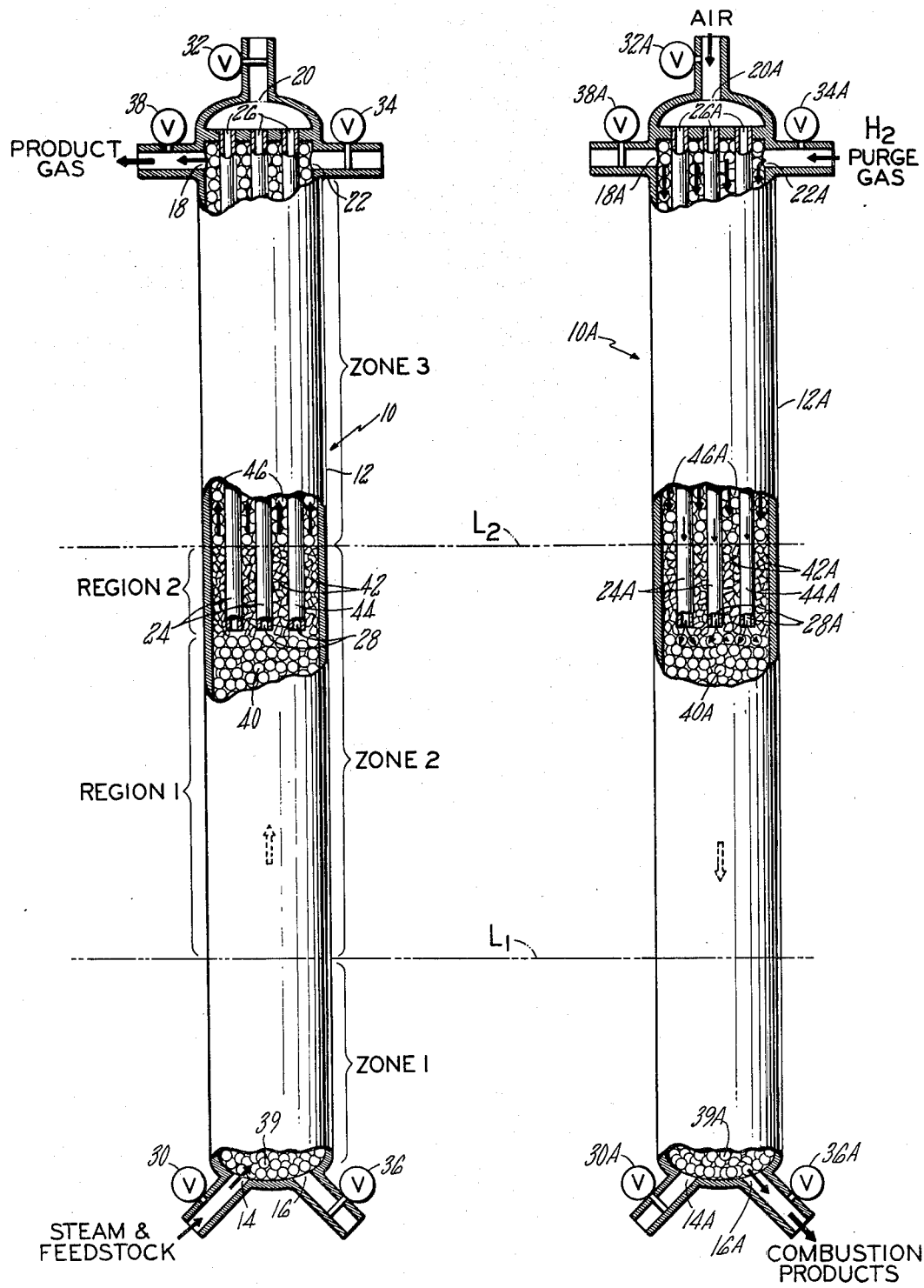
FIG. 1 is a front view, partly broken away, of a pair of catalytic reaction vessels according to the present invention.

As an exemplary embodiment of the present invention consider the pair of reactors 10 and 10A shown in FIG. 1, which are designed to produce hydrogen. These reactors are identical. Corresponding elements of the two reactors are given the same reference numerals, except that the numerals are followed by the letter A for elements of the right-hand reactor. The reactors 10 and 10A operate in conjunction with each other, such that while one is in the "make mode" (i.e., making hydrogen) the other is in the "regeneration mode" (i.e., being regenerated). After a suitable period of time the reactors switch modes. Thus, at any point in time, one of the reactors is making hydrogen while the other reactor is being regenerated. Of course, if a continuous flow of hydrogen gas is not required, then only a single reactor could be used. Hereinafter the output from the reactor in the make mode is sometimes referred to as the "product gas". For the purposes of explanation, the reactor 10, on the left, is considered to be in the make mode, and the reactor 10A on the right is in the regeneration mode.

The reactor 10 is here shown as comprising a cylindrical reaction vessel 12. At the bottom end of the vessel is a steam and hydrocarbon feedstock inlet 14 and a combustion products outlet 16. At the top end of the vessel is a product gas outlet 18, an oxygen containing gas inlet 20, and a hydrogen purge gas inlet 22. In this embodiment the oxygen containing gas is air. Disposed within the vessel 12 are a plurality of cylindrical conduits 24 having inlets 26 and outlets 28. The inlets 26 are in gas communication with the air inlet 20. Flow into inlets 14, 20, and 22 is controlled by valves 30, 32, and 34, respectively. Flow from the outlets 16 and 18 is controlled by valves 36 and 38, respectively. As shown in the drawing, during the make mode, the valves 30 and 38 are open while the valves 32, 34, and 36 are closed.

From an operational point of view, the vessel 12 may be thought of as comprising three zones arranged in sequence or series gas flow relationship within the vessel. The zones are labeled zone 1, zone 2, and zone 3 in the drawing. Imaginary lines $L_1$ and $L_2$ have been drawn in for the purpose of visualizing and discussing where one zone ends and the next begins, although in actual operation the point where one zone ends and the next begins cannot be so precisely defined.

During the make cycle a mixture of steam and hydrocarbon feedstock enters zone 1 of the reaction vessel 12 via the inlet 14. Zone 1 is filled with an inert packing material 39, such as alumina, which has heat stored therein from the regeneration cycle. The mixture of steam and feedstock entering zone 1 are at a lower temperature than the temperature of the packing material, and thus heat is transferred to the mixture from the packing material as the mixture passes through zone 1. The hydrocarbon feedstock may be either in the form of a gas, such as natural gas, or in the form of a vaporized liquid hydrocarbon, such as naptha, No. 2 heating oil, or the like.

The end of zone 1 is considered to be that location within the vessel 12 wherein the steam and feedstock mixture have been heated to a temperature high enough such that cracking and/or reforming of the feedstock begins to occur. At this point the mixture is considered to be entering zone 2. Thus, zone 1 may be thought of as a preheating zone during the make mode. Within zone 2, cracking and reforming of the feedstock takes place. The temperature at the inlet of zone 2 will probably be somewhere between 700° F. and 1000° F., depending upon the feedstock being used and the matieral within the reactor (i.e., inert or catalytic). In this embodiment, zone 2 is divided into two regions labeled region 1 and region 2. Disposed within region 1 is a nonreducible and nonoxidizable (i.e., inert) packing material; and in region 2, which is immediately downstream of and in series gas flow relationship to region 1, is reform catalyst 42 which surrounds the lower end portions 44 of the conduits 24. The reform catalyst will typically be a metal supported on an inert ceramic material. For example, a common reform catalyst is nickel supported on alumina. The packing material 40 in region 1 may be, for example, alumina, or magnesium oxide pellets, and may be the same as the material 39 in zone 1. The packing material 40 will be, on average, considerably hotter than the material in zone 1 as a result of combustion taking place therein during the regeneration mode. As the effluent from zone 1 travels through region 1 of zone 2, the heat needed for gasification is provided by the sensible heat in the packing material 40. The temperature of the effluent from region 1 is sufficiently high to provide the heat required for the additional reforming of the hydrocarbon feedstock (within region 2) without adding heat from external sources.

The end of zone 2, which is the beginning of zone 3, is considered to be the location within the reaction vessel 12 wherein no further substantial gasification takes place. Zone 3, in this embodiment, contains only inert packing material, and is a cooling zone during the make mode. As the effluent from zone 2 is cooled, it transfers heat to inert packing material disposed in zone 3 around the conduits 24. In this embodiment the conduits 24 are empty, but they, too, could be filled with inert packing material, which would be heated indirectly by the zone 2 effluent. The length and volume of zone 3 is preferably selected so as to cool the effluent from zone 2 to a preselected temperature. The cooled effluent is then exhausted from the reaction vessel 12 via the outlet 18. This effluent is the reactor product gas. In addition to hydrogen it contains carbon monoxide, carbon dioxide, methane, and water.

Although not the case in this embodiment, zone 3 may include a region of shift catalyst in place of a portion of the inert packing material. Within the shift catalyst region carbon monoxide and water in the effluent from zone 2 would combine to produce additional hydrogen and carbon dioxide in a manner well known to those skilled in the art. This is very desirable when the product gas made in the reactor 10 is to be used in a phosphoric acid electrolyte fuel cell which cannot tolerate more than a few percent of carbon monoxide. If desired the carbon dioxide could be removed downstream of the reactor using well known scrubbing devices; but this is not necessary if the product gas is to be used in a phosphoric and electrolyte fuel cell.

Turning now to the regeneration cycle, which is occurring in reactor 10A, the valves 30A and 38A are closed and the valves 32A, 34A, and 36A are open. Air enters the vessel 12 and conduits 24 via the inlet 20. A hydrogen purge gas, as hereinbefore defined, enters the reaction vessel 12A via the inlet 22A and travels through the inert packing material 46A in zone 3 picking up heat therefrom. The air is kept separate from the hydrogen purge gas in zone 3 so that no combustion occurs within zone 3 during regeneration. Air also picks up sensible heat from the surrounding packing material. The packing material 46A is thereby cooled somewhat during the regeneration cycle. It is, of course, reheated during the make cycle when it performs the function of cooling the product gases.

The air is exhausted from the outlets 28A of the conduits 24A into the packing material 40A of zone 2, whereupon it mixes with the hydrogen purge gas from zone 3 which has just passed through the reform catalyst in region 2. By this time, the hydrogen purge gas and air have been preheated to a temperature sufficiently high to result in essentially complete combustion of the hydrogen purge gas within the reaction vessel. As combustion occurs, and as the combustion products travel through zone 2 and zone 1 and are eventually exhausted via the outlets 16A, heat is transferred to and stored in the packing material 40A and 39A. It is this stored sensible heat within the reaction vessel which is used to preheat, crack and reform the hydrocarbon feedstock during the reactor's make mode of operation. Preferably, combustion of the hydrogen purge gas is completed within zone 2, and zone 1 simply serves the purpose of cooling the products of combustion to a desired temperature.

The advantages of the present invention are many. One of the major advantages is the extremely high reactor thermal efficiency. In a system designed simply to produce hydrogen, the reactor thermal efficiency is given by the following equation:

$$\eta = \frac{(A - B) \times LHV_{H2}}{C \times LHV_f}$$

where

A is the total amount of hydrogen produced by the reactor;

B is the total amount of hydrogen in the purge gas which is burned during regeneration;

C is the total amount of hydrocarbon feedstock fed to the reactor;

$LHV_{H2}$ is the lower heating value of hydrogen, and $LHV_f$ is the lower heating value of the hydrocarbon feedstock.

Note that (A−B) is equivalent to the net amount of hydrogen produced by the reactor. When maximum efficiency is achieved, the temperature of the packing material 39 at the inlet to zone 1, at the completion of the make mode of operation, should be very close to its temperature at the completion of the regeneration mode. Further, the temperature of the packing material 46, at the exit of zone 3 at the completion of the make mode, should be very close to its temperature at the completion of the regeneration mode.

Another important advantage of the foregoing embodiment of the present invention is that an excess of oxygen can be passed through the reaction vessel to ensure complete combustion of the hydrogen purge gas without any combustion taking place within the reform catalyst contained in the reaction vessel. This is accomplished by the conduits 24, which prevent mixing of the hydrogen purge gas and air until both are downstream of the reform catalyst. In another embodiment, hereinafter to be described, the same advantage is obtained even though the hydrogen purge gas and air are permitted to mix and burn upstream of a reform catalyst region.

Although in this exemplary embodiment region 1 contains no reform catalyst, it may be desirable to include some reform catalyst in this region to enhance steam reforming during the make mode. If this is done it is preferable to minimize or not to use any excess air during regeneration in order to limit the occurrence of catalyst oxidation and the subsequent reduction of the catalyst which would take place during the make mode.

It is possible to utilize the method of the present invention with no region of reform catalyst. In other words, zone 2 may be filled with only nonreducible, nonoxidizable packing material. Conversion of the hydrocarbon feedstock to hydrogen or to other low molecular weight hydrocarbons will not, however, be as complete as when a reform catalyst region is also used; however, conversion may be adequate for certain applications.

Figure 2:
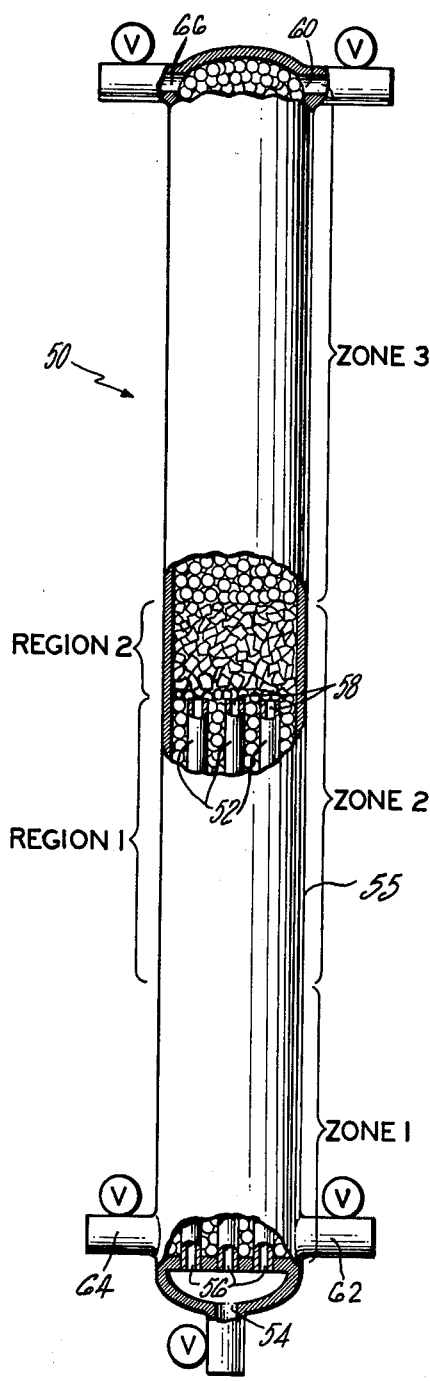
FIG. 2 is a front view, partly broken away, of another catalytic reaction vessel according to the present invention.

An alternate embodiment of the present invention is described with reference to FIG. 2. The reactor 50 of FIG. 2 differs from the reactors 10 and 10A of FIG. 1 only in the location of conduits 52 which carry the air or other oxygen containing gas into zone 2. Rather than being disposed within zone 3, as in the previous embodiment, in this embodiment they lie within zones 1 and 2. During regeneration, the air enters the reactor 50 by an inlet 54 at the bottom of the reaction vessel 55, and from there travels into the inlet ends 56 of the conduits 52. The air exits the conduits 52 at their outlet ends 58 which are at substantially the same location as the outlet ends 28, 28A of the reactors 10, 10A. Hydrogen purge gas enters the reaction vessel at the inlet 60, is preheated in zone 3, and mixes with the air from the conduits 52 at about the interface between regions 1 and 2 in zone 2, as in the foregoing embodiment. Combustion of the air and hydrogen purge gas occurs within zone 2, and cooling of the combustion products occurs in zone 1, as was also the case in the foregoing embodiment. In this embodiment, however, the air is preheated by heat from the combustion of the gases which is simultaneously occurring around the outside of the conduits 52. The combustion products leave the vessel 55 via the outlet 62. In the make mode feedstock and steam enter the vessel 55 via the inlet 64; and reaction products (i.e., the hydrogen containing gas) leave the vessel via the outlet 66.

Figure 3:
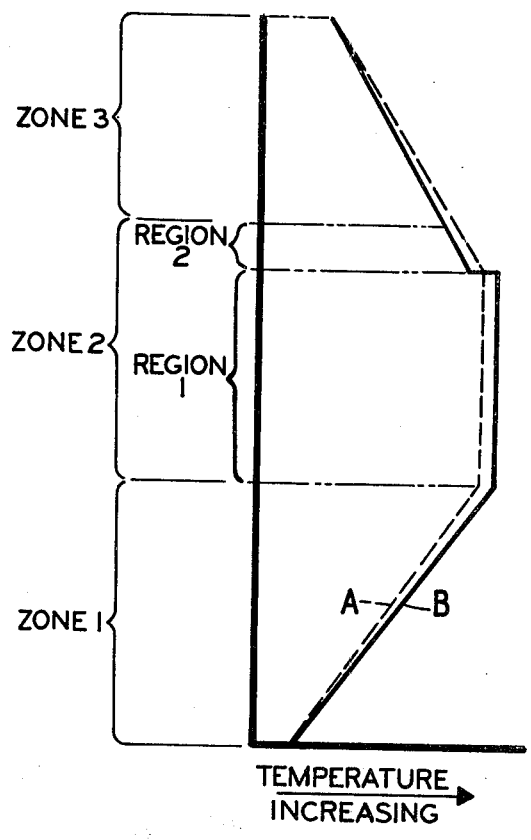
FIG. 3 is a graph of simplified temperature profiles within the catalytic reaction vessels of FIG. 1.

FIG. 3 is a graph which, in a simplified manner, depicts the temperature swings which occur within the reaction vessel of FIG. 1 over a period of time. Temperature is represented on the horizontal axis; and the location within the reaction vessel is represented by the vertical axis. For simplicity, the vertical axis is only divided up into zones 1, 2 and 3, with zone 2 being broken down into regions 1 and 2. The curve A represents the temperatures which exist within the reaction vessel at the very end of the make cycle or make mode of operation. The curve B represents the temperatures attained within the reaction vessel at the very end of the regeneration cycle. Note from curve B that immediately after regeneration the temperatures in zone 3 are lowest, since the heat stored therein during the make cycle has been used to preheat the hydrogen purge gas and oxygen containing gas. The highest temperatures exist in region 1 of zone 2, within which combustion is initiated and takes place. The temperature falls off thru zone 1 since the combustion products transfer heat to the packing material in zone 1. During the make cycle the temperatures represented by the curve B move toward the temperatures represented by the curve A, which are the temperatures at the end of the make cycle. Thus the temperatures drop within zone 1 and most of zone 2 since the preheating of the steam and feedstock as well as the gasification of the feedstock utilize the sensible heat stored in these zones. In zone 3, and region 2 of zone 2, the temperature increases as the hotter effluent from region 1 passes therethrough and is cooled as it transfers heat thereto. In operation, when the temperatures depicted by curve A are reached, the making cycle stops and regeneration begins. Ideally the curves A and B meet at the beginning of zone 1 and at the end of zone 3. Actual data (which is hereinafter presented with regard to yet another embodiment of the present invention) shows that it is possible to come quite close to this ideal situation. This data will also show that the temperature swings which occur during the practice of the present invention are quite small, which minimizes thermal shock and stresses to and within the reaction vessel.

FIG. 4 shows an embodiment of the present invention which incorporates what is herein called staged combustion. In FIG. 4 only a single reactor 100 is shown, although for the continuous production of hydrogen a pair of reactors 100 would be used in the manner discussed with respect to the embodiment of FIG. 1. The reactor 100 includes a cylindrical reaction vessel 102. The vessel 102 comprises: a steam inlet 101, including a valve 103; a feedstock inlet 104, including a valve 105; a combustion product outlet 106, including a valve 107; an air inlet 108, including a valve 109; a hydrogen purge gas inlet 110, including a valve 111; and a product gas outlet 112, including a valve 113. Disposed within the vessel 102 is a single air tube 114 having outlets 116, 118, and 120 along its length. In actual practice, the number of air tubes used would depend upon the size of the reaction vessel.

Once again, in accordance with the present invention, the reaction vessel 102 comprises three zones arranged in series gas flow relationship within the vessel. These zones are labeled 1, 2 and 3 in the drawing. Beginning at the bottom of the vessel, zone 1 includes a region 122 of inert heat transfer packing material followed by a plenum region 124. Zone 2 begins with a region 126 of inert heat transfer packing material. This region is followed by a region 128 filled with a mixture of two parts inert heat transfer packing material to one part reform catalyst, respectively. Next are inert packing region 130, reform catalyst region 132, inert packing region 134, and reform catalyst region 136. Zone 3 begins with a region 138 of inert heat transfer packing material, followed by a region 140 of high temperature shift catalyst, followed by a region 142 of low temperature shift catalyst. The three air tube outlets 116, 118 and 120 are located, respectively, at the interface between regions 134 and 136, at the interface between regions 130 and 132, and at the interface between regions 126 and 128.

In operation, during the hydrogen making mode the valves 103, 105 and 113 are open and the valves 107, 109 and 111 are closed. Steam enters the inlet 101 and is preheated in region 122 of zone 1. A liquid hydrocarbon feedstock is introduced into the plenum region 124 via the inlet 104 wherein it vaporizes and mixes with the preheated steam from the region 122. The plenum region 124 includes an open volume 125 which ensures good vaporization and mixing. Of course, as in the embodiment of FIG. 1, the hydrocarbon feedstock could be premixed with the steam upstream of the inlet 101 whereupon a plenum region within the vessel 102 would not be used.

Upon exiting the plenum region 124, or very shortly thereafter, the mixture of hydrocarbon fuel and steam will have reached a temperature high enough to result in the initiation of gasification (i.e., cracking and reforming) of the hydrocarbon fuel. Cracking and reforming continues through zone 2, the heat for the reactions being the sensible heat which was stored within the materials in zone 2 during the regenerating mode of the cycle, hereinafter described.

The effluent from zone 2 then passes through the somewhat lower temperature region 138 of inert packing material, transferring heat thereto. The effluent continues through the high temperature shift catalyst region 140 and the low temperature shift catalyst region 142. In the high temperature shift catalyst region 140 and the low temperature shift catalyst region 142 carbon monoxide reacts with water to form carbon dioxide and hydrogen, and heat is released which is stored in the shift catalyst regions. The effluent from the low temperature shift region is the desired product gas of the present invention. This gas, which is high quality hydrogen, is exhausted from the reaction vessel via the outlet 112.

The reactor is switched to the regeneration mode at any time before the temperatures therein become too low to efficiently crack and reform the feedstock. During the regeneration cycle the valves 103, 105, and 113 are closed, while the valves 107, 109, and 111 are open. Hydrogen purge gas enters the inlet 110 and is preheated by the sensible heat stored in the low temperature and high temperature shift catalyst regions 142, 140, respectively, and in the inert packing region and the reform catalyst region 138, 136, respectively. Of course, as the hydrogen purge gas travels through zone 3 and picks up heat therefrom, the temperature of the materials in zone 3 is somewhat reduced.

Air (or other oxygen containing gas) enters the air tube 114 via the inlet 108 and is also preheated as it travels through zone 3 by the heat stored in the materials which surround the air tube. A predetermined portion of the air exits the tube 114 at the outlet 116 and mixes with the hydrogen purge gas at this point, which is just downstream of the reform catalyst region 136. Burning is initiated at this point within the vessel 102. Note that, even though both shift catalyst regions 142, 140 and the reform catalyst region 136 are used to preheat the air for the regeneration cycle, none of the air passes through the catalyst materials within these regions, and the catalysts are thereby protected from oxidation. Since the air, or rather the oxygen in the air, would oxidize reform catalyst in regions further downstream of the outlet 116, the quantity of air discharged from the air tube 114 at the outlet 116 is predetermined so that it will be substantially completely burned within the immediately downstream inert packing region 134. This is a first stage of combustion.

The reform catalyst region 132 receives the combustion products from the first stage of combustion and the remaining unburned hydrogen purge gas. No substantial amount of oxygen enters this region; however, some of the heat from the combustion products is released to and stored within the reform catalyst. Air from the outlet 118 of the tube 114 is then mixed with the hydrogen purge gas in the effluent from the region 132. Once again, no more air is discharged from the outlet 118 than can be substantially completely burned within the following inert packing region 130. This constitutes a second stage of combustion. Some of the heat generated by this combustion is transferred to both the inert packing material within the region 130 and the reform catalyst-/inert packing mixture within the following region 128. At the end of the region 128 the remaining air within the tube 114 exits into the inert packing region 126 from the outlet 120, and mixes with the remaining unburned hydrogen purge gas. This mixture burns within the region 126 and transfers heat to the material therein. This is a third and final stage of combustion. Preferably complete combustion of all the combustibles in the hydrogen purge gas has taken place within zone 2. The combustion products from zone 2 are then cooled somewhat by transferring heat to the inert packing material within zone 1, and are exhausted from the raction vessel 102 via the outlet 106.

There are several advantages to using two or more combustion stages as compared to the single stage combustion of the first described embodiments. First, with staged combustion it is possible to maintain a greater total volume of reform catalyst at an efficient reforming temperature, without oxidation of the reform catalyst occurring during regeneration. Reform catalyst is more efficient at converting hydrocarbons to hydrogen than simply hot inert packing regions.

A second advantage of staged combustion is a more uniform temperature profile through zone 2. With a single stage of combustion during regeneration all of the oxygen is mixed with the hydrogen purge gas at a single location. The highest temperatures are generated at this loation, and this temperature tapers off as the combustibles and combustion products travel downstream toward the exit. Therefore, when the single combustion stage reactor is making hydrogen, the hydrocarbon fuel (i.e., feedstock) and steam mixture sees its lowest temperature initially, when it has the highest concentration of fuel and requires a maximum of energy, and the highest temperature near the end of the conversion process when it is diluted in hydrocarbon fuel and thereby requires less energy to complete the conversion. With staged combustion the temperature profile is maintained more constant since there are separate combustion regions between regions of reform catalyst. Reforming, therefore, is more efficient.

A subscale reactor identical to the reactor shown in FIG. 4 was built and tested. The reaction vessel 102 was about six feet long, as shown on the scale in FIG. 4A, and four inches in diameter. The air tube 114 was two inches in diameter. The inert packing material in regions 122, 126, 128, 130, 134, and 138 was alumina. The reform catalyst in regions 128, 132 and 136 was nickel on alumina. The high temperature shift catalyst in the region 140 was iron-chromia; and the low temperature shift catalyst in the region 142 was cobalt molybdenum. The mixture in the region 128 was two parts inert packing material to one part reform catalyst, by weight.

In initial tests, during regeneration burning of the hydrogen purge gas could not be initiated for the third combustion stage (i.e., in the region 126 downstream of the air conduit outlet 120) because the temperature of the mixture of air and hydrogen purge gas at this location was too low. Despite this lack of third stage combustion, the regeneration mode was still able to provide adequately high temperatures throughout the reaction vessel to crack and reform all of the feedstock. It was, therefore, decided that the third combustion stage was unnecessary in this particular test apparatus; and the airflows from the outlets of the air conduits were thereupon adjusted to obtain complete burning of the hydrogen purge gas within the first two combustion stages.

FIG. 4A is a graph similar to the type shown in FIG. 3, but which is plotted from actual test data using the apparatus of FIG. 4 with the hereinabove mentioned adjusted airflow so as to obtain complete burning of the hydrogen purge gas in the first two stages of combustion. Temperature is plotted on the horizontal axis, and the location along the length of the reaction vessel is plotted on the vertical axis in terms of inches from the bottom of the vessel. The data presented is from the 89th cycle of the apparatus. The graph is aligned with and is scaled to correspond in length to the apparatus which is shown in FIG. 4.

In this particular test the regeneration mode and the hydrogen make mode were each about two minutes in duration. In FIG. 4A the solid line is the temperature profile through the reactor at the end of the two minute regeneration period (i.e., the beginning of the reform period). The dashed line is the temperature profile at the end of two minutes of reforming (i.e., the beginning of the regeneration period).

During the make mode the hydrocarbon feedstock was naptha (atomic hydrogen to carbon ratio of 1.89) with 160 parts per million sulfur and 20% aromatics. The feedstock flow rate was 1.87 lbs/hr.; and the steam to carbon ratio was maintained at 3.50. The operating pressure was 1.0 atmospheres. The composition of the product gas was, on a dry basis, 69% $H_2$, 22% $CO_2$, 7% CO and about 2% methane. In a full-scale reactor with larger shift catalyst beds the CO content could be reduced to even lower levels. Also, additional shifting could be accomplished in a separate bed outside of the reactor, if necessary.

The vessel was regenerated using simulated exhaust from the anode side of a fuel cell as the hydrogen purge gas. This simulated anode exhaust comprised 0.304 lbs./hr. $H_2$, 0.334 lbs./hr. CO, 4.8 lbs./hr. $CO_2$ and 8.3 lbs./hr/ $H_2O$. The airflow rate during regeneration was 11.3 lbs./hr. with 50% of the air being discharged from the outlet 116 and 50% from the outlet 118.

In this subscale test the measured efficiency, in accordance with equation (1) above, was about 70%. Efficiency is typically lower for subscale tests due to the larger heat losses per unit of flow. From this data it is projected, using well known procedures, that a full-scale unit would have an efficiency of about 97%. This projection assumes that a full-scale unit would handle about 2,000 pounds of fuel per hour, would be about 10.0 feet long, 8.0 feet in diameter including internal insulation and contain 216 air tubes which are each about 6 feet long and 3 inches in diameter. These air tubes could contain internal packing to improve heat transfer during regeneration.

In another experiment, conducted using the same apparatus, the feedstock was No. 2 fuel oil with 3300 ppm sulfur, by weight, and 28% aromatics. An efficiency of about 70% was measured at a fuel flow rate of 2.0 pounds per hour.

As hereinabove discussed, the fuel processing apparatus of the present invention can provide the fuel for a fuel cell or for a stack of fuel cells. One possible fuel cell system is shown schematically in FIGS. 5A and 5B. Fuel reactors, such as those just described are designated by the numerals 200 and 202. A fuel cell 204 is shown schematically as having an anode or fuel electrode 206 and a cathode or oxygen electrode 208 separated by an electrolyte soaked matrix 210. In this embodiment the electrolyte is assumed to be concentrated (96%) phosphoric acid; but fuel cells utilizing other electrolytes could also be used.

Figure 5A:
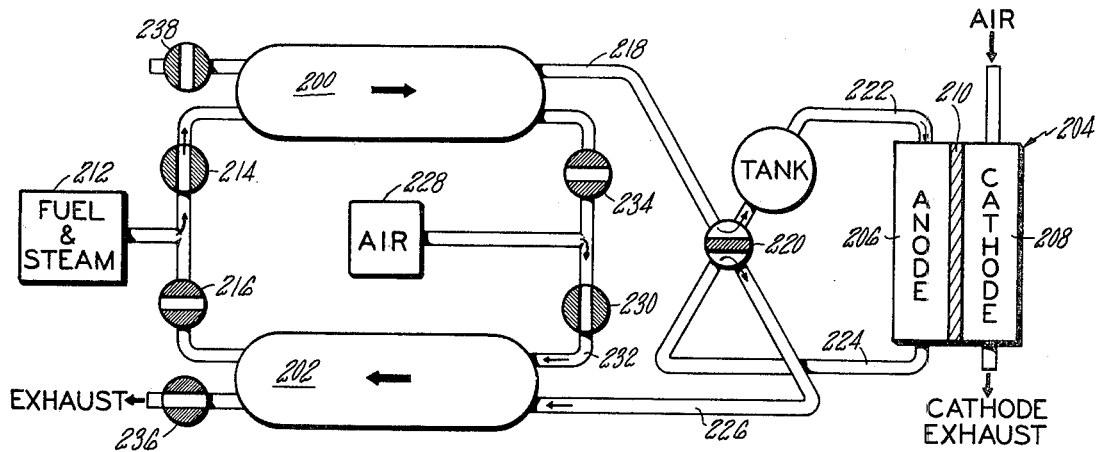
FIGS. 5A, 5B, 6A, 6B and 7 are schematic diagrams of systems which include catalytic reaction vessels integrated with fuel cells in accordance with the present invention.

Referring to FIG. 5A, in operation a hydrocarbon feedstock and steam from any suitable source 212 passes through an open valve 214 and enters the reactor 200 which is in the make mode. The valve 216 is in a closed position and prevents the fuel and steam from entering the other reactor 202 which is in the regeneration mode. The feedstock and steam are converted to hydrogen within the reactor 200. The hydrogen leaves the reactor 200 via the conduit 218 and is directed to the anode electrode 206 of the fuel cell 204 by way of a valve 220, a hydrogen switchover tank 221, and a conduit 222. The function of the tank 221 will be explained shortly. Anode exhaust, which contains unconsumed hydrogen, leaves the cell via a conduit 224 and is directed into the reactor 202 by way of the valve 220 and a conduit 226. The anode exhaust is the hydrogen purge gas used for regeneration. Air from a suitable source 228 passes through an open valve 230 and enters the reactor 202 via a conduit 232. A closed valve 234 prevents air from entering the other reactor 200. Within the reactor 202 the air from the conduit 232 and the anode exhaust from the conduit 226 combine and burn, in accordance with the present invention as hereinabove described, and the combustion products are exhausted from reactor 202 through an open valve 236. A corresponding valve 238 associated with the other reactor 200 is closed at this time.

Figure 5B:
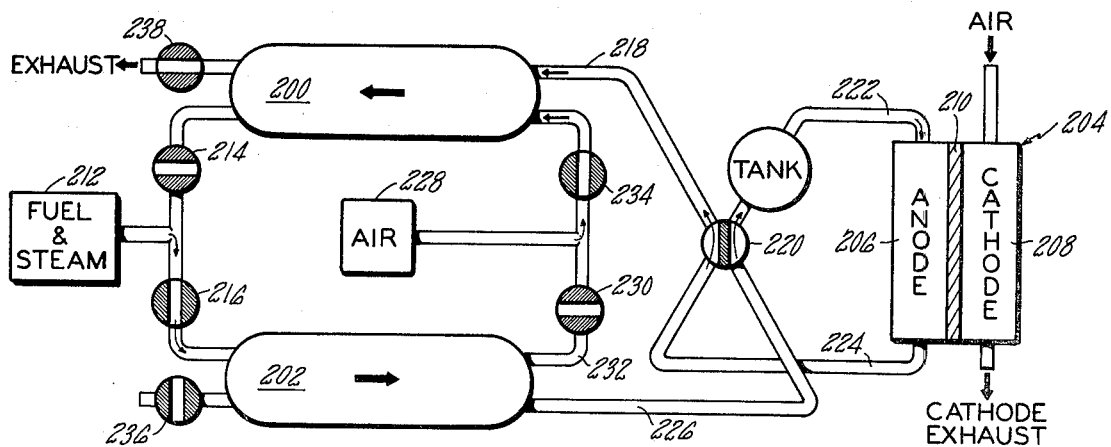

Referring now to FIG. 5B, once the reactor 202 has been regenerated the functions of the two reactors are switched by reversing the position of all the valves. Now the feedstock and steam enter the reactor 202; and the hydrogen or product gas leaves the reactor 202 via the conduit 226 and is directed to the fuel electrode 206 by way of the valve 220, the switchover tank 221, and the conduit 222. At the same time anode exhaust passes from the conduit 224 into the conduit 218, and from there into the reactor 200 along with air from the air supply 228. The combustion products from the reactor 200 are exhausted through the now open valve 238.

At the instant of switchover the regenerated reactor 202 is filled with a volume of anode exhaust and combustion products which are suddenly directed toward the anode inlet. The switchover tank, at this moment, is filled with hydrogen rich product gas. The slug of anode exhaust and combustion products in the reactor 202 passes through the tank 221 and is thereby diluted with hydrogen rich gas before it enters the fuel cell. This reduces the deleterious effects this slug of gas would otherwise have on the cell at each reactor mode change. The switchover tank should have a volume at least several times the void volume of the reactor, which is filled with packing material and catalyst.

Figure 6A:
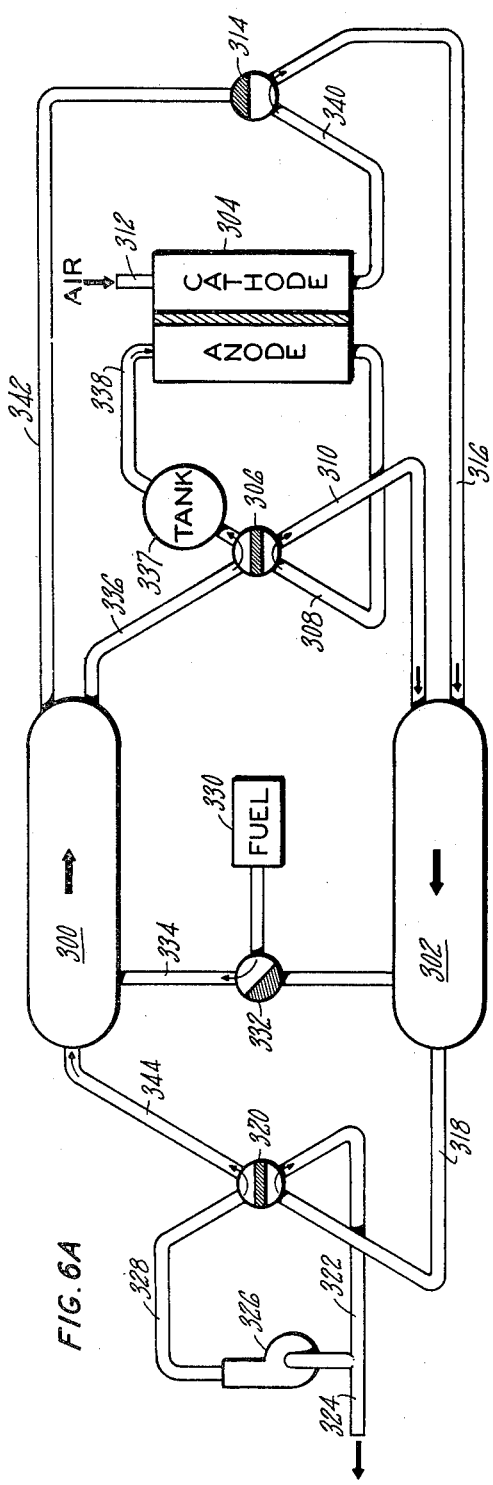
Figure 6B:
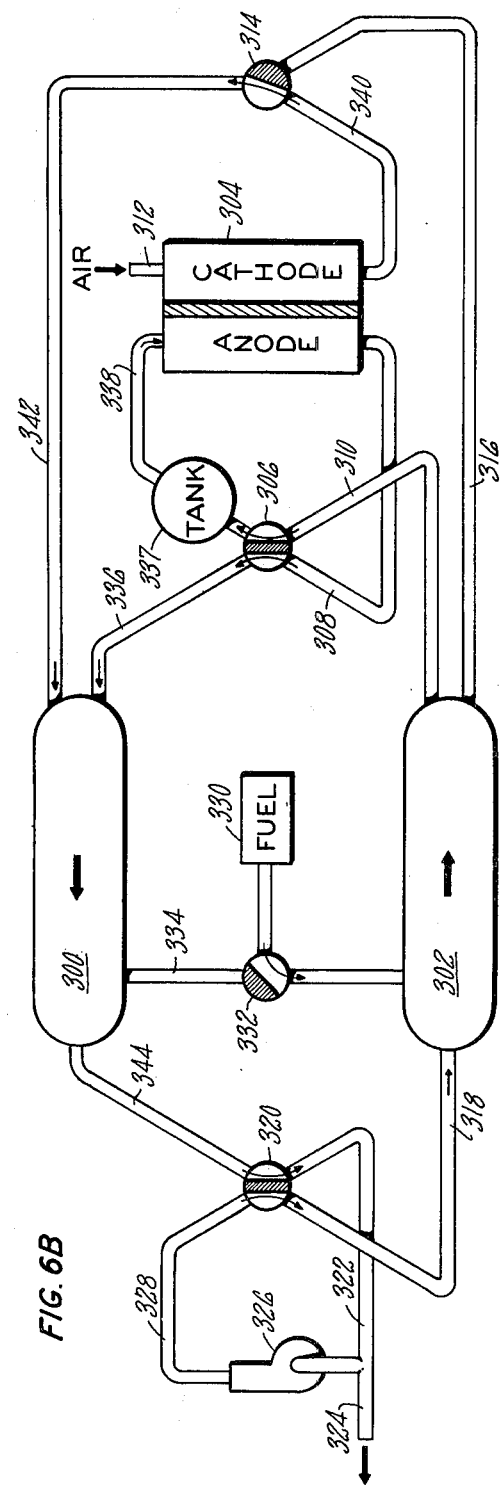

FIGS. 6A and 6B depict another fuel cell system in accordance with the teachings of the present invention. This option incorporates and improves upon the main features of commonly owned U.S. Pat. No. 4,128,700 by Richard A. Sederquist, who is also the inventor of the present invention. In FIG. 6A the reactor 300 is making hydrogen and the reactor 302 is being regenerated; while in FIG. 6B the reactor 300 is being regenerated and the reactor 302 is making hydrogen. As with the reactors 200 and 202 of FIGS. 5A and 5B, the reactors 300, 302 may be of any configuration which is in accordance with the principles of the present invention hereinabove described in connection with FIGS. 1 through 4.

Referring first to FIG. 6A, the anode exhaust from a fuel cell 304 travels through a conduit 308, a valve 306, and a conduit 310 into the reactor 302. Once again, the anode exhaust is used as the hydrogen purge gas. It contains hydrogen which was not consumed by the fuel cells, water, and other gases. Air enters the cathode compartment of the fuel cell 304 via a conduit 312. The cathode exhaust passes through a valve 314 and into the reactor 302 via a conduit 316. The cathode exhaust includes oxygen from the air which was not consumed by the fuel cell. It also includes a considerable amount of water which was produced in the fuel cell at the cathode and which is carried away from the fuel cell in the cathode exhaust. The anode and cathode exhaust mix and burn within the reactor 302 in a manner which has already been described in great detail. The combustion products, including the water (in the form of steam) which was originally in the anode and cathode exhaust, leaves the reactor 302 via a conduit 318; passes through a valve 320 and into a conduit 322. A portion of this exhaust is vented via a conduit 324, while a blower 326, in a conduit 328, pumps a portion of the exhaust through the valve 320 and into the reactor 300.

A hydrocarbon feedstock from a source 330 passes through a valve 332 and into a reactor 300 via a conduit 334. The steam necessary for the reforming reaction is obtained entirely from the recirculated portion of exhaust from the reactor 302. The reform products from the reactor 300, which in this case comprise essentially hydrogen, carbon dioxide, nitrogen, water vapor, and carbon monoxide, leave the reactor 300 via a conduit 336; pass through the valve 306 and a switchover tank 337; and enter the anode compartment of the fuel cell 304 by way of a conduit 338.

In FIG. 6B the function of the reactors 300 and 302 are reversed. The valve 306, 314, 320, and 332 are shown in their alternate position. The anode exhaust is now directed to the reactor 300 via the conduits 308 and 336; and the cathode exhaust is directed into the reactor 300 via the conduits 340 and 342. The combustion products leaves the reactor 300 via a conduit 344, and pass through the valve 320 into the conduit 322. A portion of combustion products is vented via the conduit 324, and the blower 326 recirculates the rest to the reactor 302 by way of the conduits 328 and 318. The steam laden exhaust from the reactor 300 mixes with the feedstock from the supply 330 within the reactor 302, and cracking and steam reforming takes place. The product hydrogen is then directed to the anode compartment of the fuel cell 304 by way of the conduit 310, switchover tank 337, and conduit 338.

The embodiment just described may be utilized with any acid electrolyte type fuel cell, but is particularly preferred when the fuel cell utilizes concentrated phosphoric acid as the electrolyte.

Figure 7:
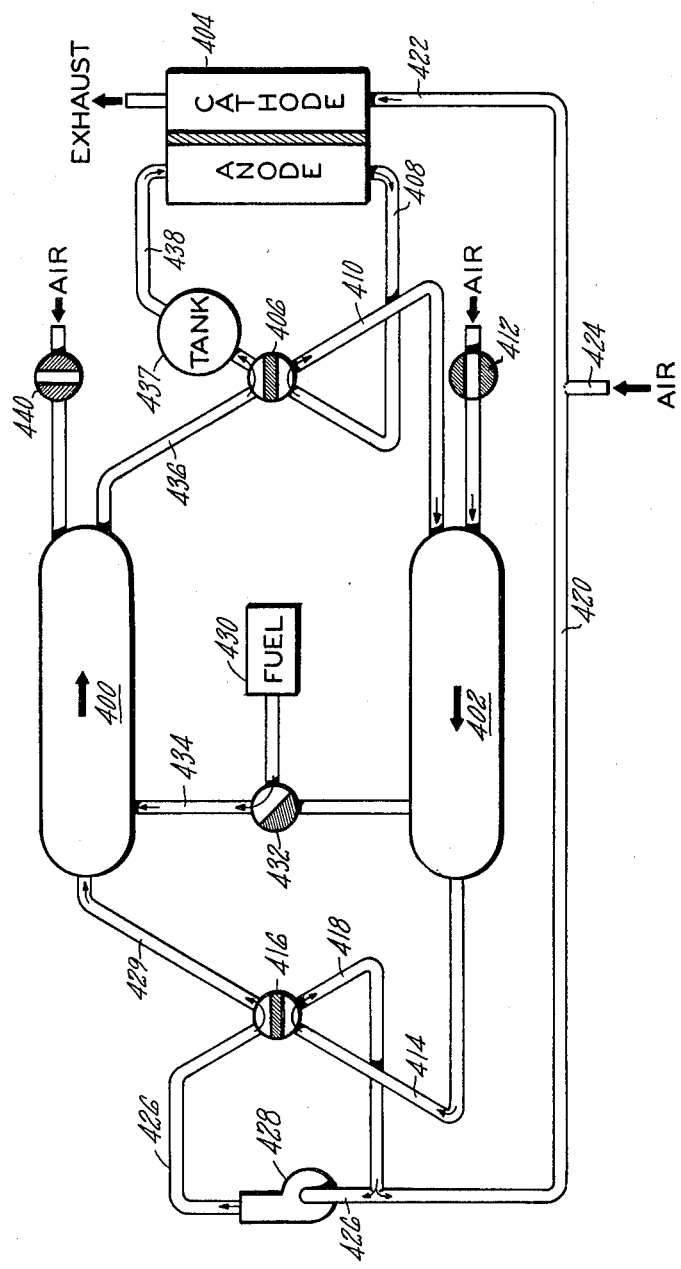

FIG. 7 shows a system in accordance with the present invention particularly suited for use with fuel cells utilizing electrolytes which are carbonates of alkali metals that are molten at cell operating temperatures. Carbonates of potassium, lithium, sodium, and combinations thereof are most commonly used. Cells using this type of electrolyte are generally referred to as molten carbonate electrolyte fuel cells. In FIG. 7 the reactor 400 is making hydrogen while the reactor 402 is being regenerated. The exhaust from the anode side of a molten carbonate electrolyte fuel cell 404 is routed through a valve 406 to the reactor 402 by way of conduits 408 and 410. The anode exhaust contains hydrogen which was not consumed by the fuel cell. It also includes carbon dioxide and water, which are products from the electrochemical reaction which takes place in a molten carbonate electrolyte fuel cell.

Air enters the reactor 402 through an open valve 412. The oxygen in the air and the hydrogen and other combustibles in the anode exhaust combine and burn within the reactor 402. The reactor exhaust, which includes steam and noncombustible carbon dioxide, leaves the reactor 402 via a conduit 414; passes through a valve 416; and enters a conduit 418. A portion of the exhaust is delivered to the cathode of the fuel cell via the conduits 420 and 422. The carbon dioxide in the exhaust is needed at the cathode for the fuel cell electrochemical reaction, as is well known in the molten carbonate fuel cell art. Air, which provides the oxygen for the electrochemical reaction, is added to the cathode input via a conduit 424.

A blower 428 delivers a second portion of the exhaust from the reactor 402 to the reactor 400 by way of a conduit 426, the valve 416, and a conduit 429. This portion of the exhaust includes sufficient water, in the form of steam, for the steam reforming reaction in the reactor 400. A hydrocarbon feedstock from a source 430 is directed through a valve 432 into the reactor 400 by means of a conduit 434. The steam and fuel react within the reactor 400 in accordance with details of the present invention already described, and hydrogen is produced. The hydrogen leaves the reactor 400 via a conduit 436; passes through the valve 406 and switchover tank 437; and is directed to the anode of the fuel cell via the conduit 438.

Once the reactor 402 is regenerated the mode of operation of the reactors is reversed. In this other mode all of the valves are in their opposite position such that the reactor 400 receives the anode exhaust and air, while the reactor 402 receives the hydrocarbon feedstock and a portion of the exhaust from the reactor 400. The remainder of the exhaust from the reactor 400 is directed to the cathode of the fuel cell via the conduits 420 and 422. The hydrogen now being produced by the reactor 402 will then pass through conduit 410, the valve 406, the switchover tank 437, and the conduit 438, and to the anode of the fuel cell 404.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a method for providing a continuous supply of hydrogen fuel to a fuel cell from a pair of reaction vessels, said fuel cell comprising a fuel electrode, an oxygen electrode, and an electrolyte disposed therebetween, the steps of alternately:

A. making hydrogen fuel in one of said pair of vessels while simultaneously regenerating the other of said pair of vessels; and B. regenerating said one of said pair of vessels while simultaneously making hydrogen fuel in said other of said pair of vessels;

wherein steps (A) and (B) each comprise the steps of:

(a) introducing a hydrocarbon feedstock and steam into a first of said vessels, which is making hydrogen;

(b) cracking and steam reforming said feedstock to make said hydrogen in said first vessel using sensible heat stored within said first vessel, said sensible heat being obtained from the step of regenerating said first vessel;

(c) directing the hydrogen produced in step (a) to the fuel electrode of the fuel cell;

(d) introducing air into the oxygen electrode of the fuel cell;

(e) directing the exhaust from the fuel electrode and an oxygen containing gas into the second of said vessels, which is being regenerated;

(f) preheating said oxygen containing gas and said fuel electrode exhaust separately within said second vessel to temperatures high enough to result in combustion of said oxygen containing gas and said fuel electrode exhaust if they are mixed together;

(g) mixing said preheated oxygen containing gas and said preheated fuel electrode exhaust within said second vessel and combusting said mixture within said second vessel to regenerate said second vessel by storing within material disposed within said second vessel heat from said step of combusting, wherein said step (f) of preheating is accomplished using the heat from said step of combusting and/or sensible heat stored within said second vessel;

(h) exhausting the products of combustion of step (g) from said second vessel.

2. The method according to claim 1 wherein the step (a) of introducing steam into said first vessel includes introducing at least a portion of the exhaust from said second vessel into said first vessel, said exhaust from said second vessel providing the steam for said reforming.

3. The method according to claim 2 wherein said step (e) of directing an oxygen containing gas into said second vessel includes directing exhaust from said oxygen electrode into said second vessel.

4. The method according to claim 2 wherein the electrolyte disposed between said electrodes is molten carbonate and wherein steps (A) and (B) also comprise the step of introducing a portion of the exhaust from said second vessel into said oxygen electrode of the fuel cell.

5. The method according to claim 3 wherein the electrolyte disposed between said electrodes is phosphoric acid.

6. The method according to claim 2 including the step of preheating within said first vessel, prior to step (b) of cracking and reforming, one or both of said feedstock and exhaust from said second vessel using sensible heat stored within said first vessel.

7. The method according to claim 6 wherein the step (b) of cracking and reforming includes gas flow through said vessels countercurrent to the direction of flow of the combusting mixture during step (g).

8. A fuel cell system comprising:
a fuel cell including a fuel electrode, an oxygen electrode, and an electrolyte disposed therebetween;
a pair of reaction vessels, each being adapted to alternately make a hydrogen containing gas and to be regenerated, each of said reaction vessels having an upstream end and a downstream end, each vessel having disposed therein, in sequence from its upstream to downstream end, a first volume of inert packing material containing no reform catalyst, a second volume of material including a first region of reform catalyst material, and a third volume of material;
means for alternately directing a hydrocarbon feedstock and steam first into said first volume of one of said vessels and then into said first volume of the other of said vessels;
means for directing the hydrogen containing gas produced in the one of said vessels receiving said feedstock and steam into said fuel electrode of said fuel cell and for directing the exhaust from said fuel electrode into said third volume of material in the other of said vessels;
conduit means within each of said vessels in heat transfer relationship with at least some of said materials disposed in said vessels and including outlet means upstream of said first region of reform catalyst;
means for directing an oxygen containing gas into said conduit means, said conduit means constructed and arranged to prevent mixing of the oxygen containing gas and fuel electrode exhaust downstream of or within said first region of reform catalyst; and
each of said vessels including combustion products outlet means at its upstream end for exhausting combustion products therefrom during regeneration of each vessel.

9. The fuel cell system according to claim 8 wherein said third volume of material includes shift catalyst.

10. The reaction apparatus according to claim 8 or 9 wherein said conduit means passes through said third volume of material and includes inlet means located near the downstream end of said third volume of material.

11. The fuel cell system according to claim 8 or 9 wherein said conduit means is disposed entirely upstream of said first region of reform catalyst material.

12. The fuel cell system according to claim 8 wherein said electrolyte is phosphoric acid.

13. The fuel cell system according to claim 8 or 12 wherein said means for directing an oxygen containing gas into said conduit means includes means for directing the exhaust from said oxygen electrode into said conduit means, said system also including means for directing at least a portion of the combustion products from said combustion products outlet means of the vessel being regenerated into said first volume of material at the upstream end of the vessel producing the hydrogen containing gas.

14. The fuel cell system according to claim 8 wherein said electrolyte is an alkali metal which is molten at fuel cell operating temperatures, said system including means for directing a first portion of the combustion products from the combustion products outlet means of the vessel being regenerated into the first volume of material in the vessel producing hydrogen, and for directing air and a second portion of the combustion products to said oxygen electrode of said fuel cell.

* * * * *